United States Patent
Wang

(10) Patent No.: US 11,990,010 B2
(45) Date of Patent: May 21, 2024

(54) METHODS AND APPARATUSES FOR EARLY WARNING OF CLIMBING BEHAVIORS, ELECTRONIC DEVICES AND STORAGE MEDIA

(71) Applicant: BOE Technology Group Co., Ltd., Beijing (CN)

(72) Inventor: Guangli Wang, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 57 days.

(21) Appl. No.: 17/971,498

(22) Filed: Oct. 21, 2022

(65) Prior Publication Data

US 2023/0039549 A1   Feb. 9, 2023

Related U.S. Application Data

(63) Continuation-in-part of application No. PCT/CN2021/107847, filed on Jul. 22, 2021.

(51) Int. Cl.
*G08B 13/196* (2006.01)
*G06V 40/16* (2022.01)
(Continued)

(52) U.S. Cl.
CPC ..... *G08B 13/19606* (2013.01); *G06V 40/166* (2022.01); *G06V 40/171* (2022.01);
(Continued)

(58) Field of Classification Search
CPC .. G06V 40/166; G06V 40/171; G06V 40/172; G06V 40/23; G08B 31/00
See application file for complete search history.

(56) References Cited

U.S. PATENT DOCUMENTS

| 5,594,422 A | 1/1997 | Huey, Jr. et al. |
| 2013/0046462 A1 | 2/2013 | Feyereisen et al. |

(Continued)

FOREIGN PATENT DOCUMENTS

| CN | 109522793 A | 3/2019 |
| CN | 109754411 A | 5/2019 |

(Continued)

OTHER PUBLICATIONS

PCT/CN2021/107847 international search report.
(Continued)

*Primary Examiner* — Nabil H Syed
*Assistant Examiner* — Cal J Eustaquio
(74) *Attorney, Agent, or Firm* — IPro, PLLC

(57) ABSTRACT

A method and an apparatus for early warning of climbing behaviors, an electronic device, and a storage medium are disclosed. The method includes: acquiring video image data including a monitored target and at least one object (11); acquiring behavior information of the at least one object when it is determined that the at least one object enters a target area corresponding to the monitored target (12); marking video frames in which the at least one object is included when it is determined that the behavior information indicates that the at least one object climbs the monitored target (13). By marking the video frames in the video image data, the behavior of the object climbing the monitored target can be found in time, and the management efficiency can be improved.

17 Claims, 5 Drawing Sheets

---

Acquire video image data including a monitored target and at least one object — 11

↓

Acquire behavior information of the at least one object when it is determined that the at least one object enters a target area corresponding to the monitored target — 12

↓

Mark video frames in which the at least one object is included when it is determined that the behavior information indicates that the at least one object climbs the monitored target — 13

(51) Int. Cl.
  *G06V 40/20* (2022.01)
  *G08B 31/00* (2006.01)
(52) U.S. Cl.
  CPC ............ *G06V 40/172* (2022.01); *G06V 40/23* (2022.01); *G08B 13/19613* (2013.01); *G08B 31/00* (2013.01)

(56) References Cited

U.S. PATENT DOCUMENTS

2017/0213436 A1    7/2017  Stout et al.
2018/0174426 A1*   6/2018  Jones ................. G06V 40/23

FOREIGN PATENT DOCUMENTS

| CN | 110263623 A | 9/2019 |
| CN | 110378259 A | 10/2019 |
| CN | 110446015 A | 11/2019 |
| CN | 110598596 A | 12/2019 |
| CN | 110942582 A | 3/2020 |
| CN | 111191511 A | 5/2020 |
| CN | 111209774 A | 5/2020 |
| CN | 111931633 A | 11/2020 |
| CN | 112183317 A | 1/2021 |
| CN | 113052139 A | 6/2021 |
| JP | 2021026292 A | 2/2021 |

OTHER PUBLICATIONS

PCT/CN2021/107847 Written Opinion.
Da Guan et al, "A Small Climbing Robot for the Intelligent Inspection of Nuclear Power Plants", 2014 4th IEEE International Conference on Information Science and Technology, Apr. 30, 2014.
Xiao-hong Xing, "The Research of Human Abnormal Behavior Recognition Based on Video", Thesis for Master s Degree, Shenyang Aerospace University, Aug. 15, 2017.
Zhihui Yang, "Research and Development of Intelligent Video Surveillance System", Thesis for Master s Degree, Shenyang Aerospace University, Jan. 2014.
Xixi, "Application and Deployment of AI Behavior Analysis in Smart Tourist Attraction", www.elecfans.com, Oct. 21, 2020.
Wei Li et al, "Abnormal Event Detection of Regional Weather Station Based on Intelligent Video Analysis", Journal of Hainan University, DOI: 10.15886/j.cnki.hdxbzkb.2021.0006.

* cited by examiner

METHODS AND APPARATUSES FOR EARLY WARNING OF CLIMBING BEHAVIORS, ELECTRONIC DEVICES AND STORAGE MEDIA

CROSS REFERENCE TO RELATED APPLICATIONS

The present application is a Continuation Application of International patent application No. PCT/CN2021/107847 filed on Jul. 22, 2021, the contents of which are incorporated here in its entirety by reference.

TECHNICAL FIELD

The present disclosure relates to the technical field of data processing, in particular to a method and an apparatus for early warning of climbing behaviors, an electronic device, and a storage medium.

BACKGROUND

With the increase in the number of tourists in scenic spots, uncivilized behaviors of tourists increase, such as inscribing graffiti on cultural relics, climbing sculptures, etc. Taking the climbing sculpture as an example, the sculpture may be damaged and the tourists themselves may also be hurt during climbing, which will at the same time have a bad influence on other tourists.

In order to find and solve the above-mentioned uncivilized behaviors in time, video surveillance systems are usually installed in existing scenic spots, and security personnel stare at the monitoring display screen in real time to find uncivilized behaviors in time.

However, it is easy for security personnel to get tired when staring at a plurality of scenes at the same time, and uncivilized behavior is accidental, resulting in poor accuracy of early warning.

SUMMARY

The present disclosure provides a method and an apparatus for early warning of climbing behaviors, an electronic device, and a storage medium, so as to solve the deficiencies of the related art.

According to a first aspect of the embodiments of the present disclosure, there is provided a method for early warning of climbing behavior, the method includes:
acquiring video image data including a monitored target and at least one object;
acquiring behavior information of the at least one object when it is determined that the at least one object enters a target area corresponding to the monitored target; and
marking video frames in which the at least one object is included when it is determined that the behavior information indicates that the at least one object climbs the monitored target.

Optionally, determining that the at least one object enters the target area corresponding to the monitored target includes:
acquiring the target area where the monitored target is located in a plurality of video frames in the video image data, and acquiring an object area where a target object is located, a head of the target object being located in the target area;
acquiring a tempo-spatial relation between the object area and the target area, the tempo-spatial relation referring to a relative positional relation between the object area and the target area in space at different times; and
determining that the target object enters the target area when it is determined that the tempo-spatial relation satisfies a first preset condition,
where the first preset condition includes at least one of the following: the object area is within the target area and a distance between a bottom edge of the object area and a bottom edge of the target area does not exceed a set distance threshold, and the object area successively touches an edge and two mark lines of the target area and the distance between the bottom edge of the object area and the bottom edge of the target area does not exceed the set distance threshold, where the two mark lines are provided between a connecting line of the target area and the monitored target.

Optionally, the tempo-spatial relation includes at least one of the following:
the object area is within the target area, the object area successively touches the edge and the two mark lines of the target area, the object area successively touches the two mark lines and the edge of the target area, the distance between the bottom edge of the object area and the bottom edge of the target area exceeds the set distance threshold, the distance between the bottom edge of the object area and the bottom edge of the target area is less than the set distance threshold, and the object area is outside the target area.

Optionally, acquiring the object area where the target object is located includes:
acquiring a position of a head of each object and an object area where each object is located in the plurality of video frames in the video image data; and
selecting an object whose head is located in the target area as the target object, and acquiring the object area where the target object is located.

Optionally, acquiring the position of the head of each object in the plurality of video frames in the video image data includes:
acquiring one or more preset image features of each video frame in the plurality of video frames;
identifying an identification position of the head in a current video frame based on one or more the preset image features, and predicting a prediction position of the head in a next video frame; and
matching the identification position with the prediction position, and updating the prediction position to the identification position after the matching is passed, so as to obtain the position of the same head in two adjacent video frames.

Optionally, acquiring the behavior information of the at least one object includes:
acquiring positions of behavior information key parts of a target object in the plurality of video frames in the video image data, a head of the target object being located in the target area, and the behavior information including human posture;
generating one-dimensional vectors for the behavior information key parts in respective video frames according to a preset expression order;
cascading the corresponding one-dimensional vectors in respective video frames to obtain a frame of RGB image, RGB channels in the RGB image respectively corresponding to xyz axis coordinates of each of the behavior information key parts; and
acquiring the behavior information of the target object according to the RGB image.

Optionally, determining that the behavior information indicates that the at least one object climbs the monitored target includes:
  determining positions of one or more designated parts of a target object based on the behavior information, the behavior information including human posture; and
  when the positions of the one or more designated parts are within the target area and distances from a bottom edge of the target area exceed a set distance threshold, determining that the behavior information indicates that the target object climbs the monitored target.

Optionally, after marking the video frames in which the at least one object is included, the method further includes:
  acquiring face images of a target object;
  acquiring an identification code matched with the face images when the face images meet preset requirements, the preset requirements including key points of a face can be obtained and a confidence of an identification result exceeds a set confidence threshold; and
  generating early warning information when it is determined that there is no object matched with the identification code in a designated database.

According to a second aspect of the embodiments of the present disclosure, there is provided an apparatus for early warning of climbing behaviors, the apparatus includes:
  a data acquiring module, configured to acquire video image data including a monitored target and at least one object;
  an information acquiring module, configured to acquire behavior information of the at least one object when it is determined that the at least one object enters a target area corresponding to the monitored target; and
  a video marking module, configured to mark video frames in which the at least one object is included when it is determined that the behavior information indicates that the at least one object climbs the monitored target.

Optionally, the information acquiring module includes:
  an area acquiring sub-module, configured to acquire the target area where the monitored target is located in a plurality of video frames in the video image data and acquire an object area where a target object is located, a head of the target object being located in the target area;
  a relation acquiring sub-module, configured to acquire a tempo-spatial relation between the object area and the target area, the tempo-spatial relation referring to a relative positional relation between the object area and the target area in space at different times; and
  an area determining sub-module, configured to determine that the target object enters the target area when it is determined that the tempo-spatial relation satisfies a first preset condition,
  where the first preset condition includes at least one of the following: the object area is within the target area and a distance between a bottom edge of the object area and a bottom edge of the target area does not exceed a set distance threshold, and the object area successively touches an edge and two mark lines of the target area and the distance between the bottom edge of the object area and the bottom edge of the target area does not exceed the set distance threshold, where the two mark lines are provided between a connecting line of the target area and the monitored target.

Optionally, the tempo-spatial relation includes at least one of the following:
  the object area is within the target area, the object area successively touches the edge and the two mark lines of the target area, the object area successively touches the two mark lines and the edge of the target area, the distance between the bottom edge of the object area and the bottom edge of the target area exceeds the set distance threshold, the distance between the bottom edge of the object area and the bottom edge of the target area is less than the set distance threshold, and the object area is outside the target area.

Optionally, the area acquiring sub-module includes:
  a position acquiring unit, configured to acquire a position of a head of each object and an object area where each object is located in the plurality of video frames in the video image data; and
  an object selecting unit, configured to select an object whose head is located in the target area as the target object and acquire the object area where the target object is located.

Optionally, the position acquiring unit includes:
  a feature acquiring sub-unit, configured to acquire one or more preset image features of each video frame in the plurality of video frames;
  a position predicting sub-unit, configured to identify an identification position of the head in a current video frame based on the one or more preset image features and predict a prediction position of the head in a next video frame; and
  a position acquiring sub-unit, configured to match the identification position with the prediction position and update the prediction position to the identification position after the matching is passed, so as to obtain the position of the same head in two adjacent video frames.

Optionally, the information acquiring module includes:
  a position acquiring sub-module, configured to acquire positions of behavior information key parts of a target object in the plurality of video frames in the video image data, a head of the target object being located in the target area, and the behavior information including human posture;
  a vector generating sub-module, configured to generate one-dimensional vectors for the behavior information key parts in respective video frames according to a preset expression order;
  an image acquiring sub-module, configured to cascade the corresponding one-dimensional vectors in respective video frames to obtain a frame of RGB image, RGB channels in the RGB image respectively corresponding to xyz axis coordinates of each of the behavior information key parts; and
  a behavior information acquiring sub-module, configured to acquire the behavior information of the target object according to the RGB image.

Optionally, the video marking module includes:
  a position determining sub-module, configured to determine positions of one or more designated parts of a target object based on the behavior information, the behavior information including human posture; and
  a target determining sub-module, configured to, when the positions of the one or more designated parts are within the target area and distances from a bottom edge of the target area exceed a set distance threshold, determine that the behavior information indicates that the target object climbs the monitored target.

Optionally, the apparatus further includes:
  an image acquiring module, configured to acquire face images of a target object;
  an identification code acquiring module, configured to acquire an identification code matched with the face images when the face images meet preset requirements, the preset requirements including key points of a face can be obtained and a confidence of an identification result exceeds a set confidence threshold; and a signal generating module, configured to generate early warning information when it is determined that there is no object matched with the identification code in a designated database.

According to a third aspect of the embodiments of the present disclosure, there is provided an electronic device, including:

a processor;

a memory configured to store a computer program executable by the processor, where the processor is configured to execute the computer program in the memory to implement the above methods.

According to a fourth aspect of the embodiments of the present disclosure, there is provided a computer readable storage medium. When an executable computer program in the storage medium is executed by a processor, above methods can be realized.

The technical solutions provided by the embodiments of the present disclosure may include the following beneficial effects:

As can be seen from the above embodiments, according to the solutions provided by the embodiments of the present disclosure, video image data which includes a monitored target and at least one object may be acquired; when it is determined that the at least one object enters a target area corresponding to the monitored target, behavior information of the at least one object is acquired; and when it is determined that the behavior information indicates that the at least one object climbs the monitored target, video frames in which the at least one object is included are marked. In this way, by marking the video frames in the video image data in this embodiment, the behavior of the object climbing the monitored target can be found in time, and the management efficiency can be improved.

It should be understood that the above general description and the following detailed description are exemplary and explanatory only, and do not limit the present disclosure.

BRIEF DESCRIPTION OF THE DRAWINGS

The accompanying drawings, which are incorporated into and constitute a part of the specification, illustrate embodiments consistent with the present disclosure, and together with the specification serve to explain the principles of the present disclosure.

DETAILED DESCRIPTION OF THE EMBODIMENTS

Exemplary embodiments will be described in detail herein, examples of which are illustrated in the accompanying drawings. When the following description refers to the drawings, unless otherwise indicated, the same numerals in different drawings indicate the same or similar elements. The exemplary embodiments described below do not represent all embodiments consistent with the present disclosure. Rather, they are merely examples of device consistent with some aspects of the present disclosure, as recited in the appended claims.

Figure 1:
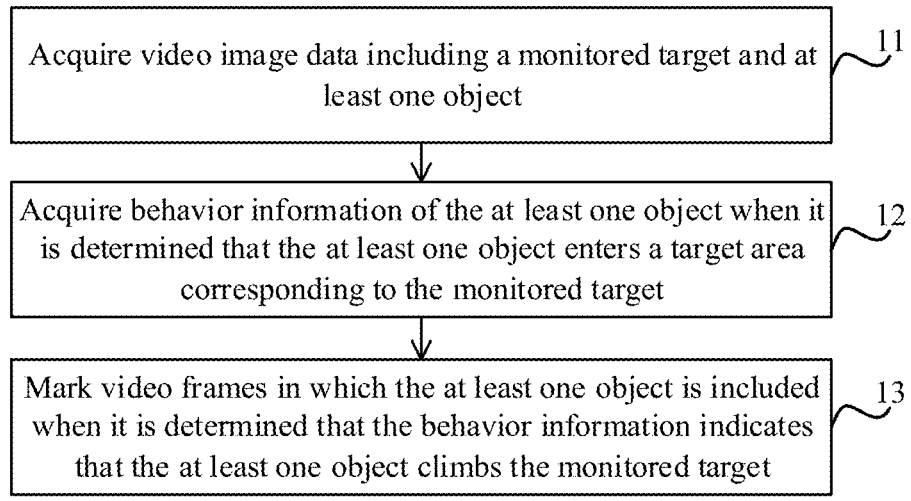
FIG. 1 is a flowchart illustrating a method for early warning of climbing behaviors according to an exemplary embodiment.

In order to solve the above technical problems, one or more embodiments of the present disclosure provide a method for early warning of climbing behaviors, which is applicable to an electronic device. FIG. 1 is a flowchart illustrating a method for early warning of climbing behaviors according to an exemplary embodiment. As shown in FIG. 1, the method for early warning of climbing behaviors includes steps 11 to 13.

In step 11, video image data including a monitored target and at least one object is acquired.

In this embodiment, the electronic device may be connected to a camera and receive the video image data output by the camera. For example, when the camera is turned on, video frames may be captured to form a video frame stream, and then the video frames may be encoded and compressed before being sent to the electronic device. The above-mentioned video image data may be obtained after processing such as decoding is performed on the received image data by the electronic device.

Considering that the solution provided by the present disclosure intends to monitor some target behaviors, such as climbing, inscribing graffiti and other uncivilized behaviors, the capturing range of the above-mentioned camera usually points to designated monitored target, where the monitored target may include but not limited to statues in scenic spots, cultural relics in museums, safety guardrails, etc., in other words, the video image data obtained by electronic device includes the monitored target.

It can be understood that the video image data may or may not include objects, where the objects may be tourists or managers. Considering that the solution provided by the present disclosure is applied to scene including objects, only scenes including at least one object in the video image data are considered in subsequent embodiments.

In step 12, behavior information of the at least one object is acquired when it is determined that the at least one object enters a target area corresponding to the monitored target.

Figure 2:
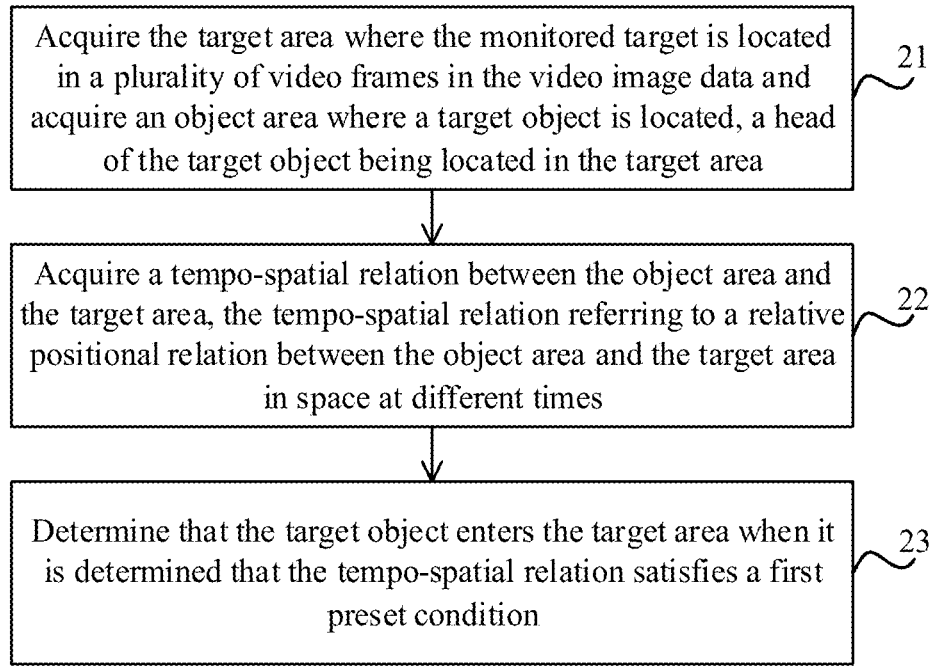
FIG. 2 is a flowchart illustrating determining a current behavior of a target object according to an exemplary embodiment.

In this embodiment, the electronic device may process the above-mentioned video image data to determine whether the object enters the target area corresponding to the monitored target, as shown in FIG. 2, which includes steps 21 to 23.

In step 21, the electronic device may acquire the target area where the monitored target is located in a plurality of video frames in the video image data and acquire an object area where a target object is located.

Taking the acquisition of the target area as an example, a target identification model may be stored in the electronic device in advance, such as a convolutional network model (CNN). The electronic device may input each video frame in the video image data into the target identification model, which may identify the monitored target in each video frame in the video image data, and then generate a minimum bounding rectangle according to the shape of the monitored target. The area corresponding to the minimum bounding rectangle in the video frame is the target area, in other words, the target area where the monitored target is located in the plurality of video frames may be obtained through the above identification process. It can be understood that the above-mentioned minimum bounding rectangle may also be replaced by other preset shapes, such as circle, diamond, etc. The corresponding solutions that can obtain the target area fall within the protection scope of the present disclosure.

Taking the acquisition of the object area as an example, a head detection model, such as a convolutional network model, may be stored in the electronic device in advance. In this example, the head detection model is a CNN-based lightweight detection model, which may be adapted to scenes where the resource allocation of the electronic device is relative low, or may be adapted to scenes where the existing monitoring system is upgraded or reconstructed. In this way, by setting the above-mentioned lightweight detection model in this example, which maintains the identification performance while reducing the quantity of parameters of the lightweight detection model, the detection result can have a high confidence.

In this example, the lightweight detection model may be obtained through model compression and model pruning. Model compression indicates that parameter compression is performed on a trained model, so that the model carries fewer model parameters, thereby reducing the problem of occupying more memory and improving processing efficiency.

Model pruning refers to retaining important weights and removing unimportant weights under the premise of ensuring the precision of CNN. Usually, the closer the weight value is to 0, the less important the weight is. Model pruning may include: 1. the structure of the blob is modified or not, the diagonal mask is directly defined, and the original matrix is rewritten into a sparse matrix storage; 2. a new method is used to calculate the multiplication of sparse matrix and vector. In other words, there are two starting points when pruning. One includes modifying the blob with the blob as the starting point and storing the diagonal mask in the blob structure. The blob-based method may directly run operations related to the diagonal mask on CPU or GPU, which is more efficient. The other includes directly defining the diagonal mask with the layer as the starting point. This method is relatively simple, but the efficiency is relatively low.

It should be noted that, when setting a pruning rate, a global pruning rate may be set, or a pruning rate may be separately set for each layer. In practical applications, the actual value of the pruning rate can be obtained experimentally.

It should also be noted that, in general, the precision of the model will decline after the unimportant weights are removed. However, the sparsity of the model increases after the unimportant weights are removed, which can reduce the over-fitting of the model, and the precision of the model will be improved after fine-tuning.

There are two starting points when pruning. One includes modifying the blob with the blob as the starting point and storing the diagonal mask in the blob structure. The other includes directly defining the diagonal mask with the layer as the starting point. These two methods have their own characteristics. The blob-based method may directly run operations related to the diagonal mask on CPU or GPU, which is more efficient, but requires a better understanding of the source code. The layer-based method is relatively simple, but the efficiency is relatively low.

The present disclosure may optimize the confidence in the above-mentioned lightweight detection model. For example, firstly, a confidence threshold of the head is gradually reduced from a preset value (such as 0.7) until the recall of the head detection result exceeds a recall threshold. Then, in combination with the tracking result of the head tracking model and the above detection result, the recall and precision of the same head are concerned, and the confidence threshold of the head is continuously adjusted (fine-tuned) until for a same head, the recall exceeds the recall threshold and the precision exceeds a precision threshold, for example, both the recall threshold and the precision threshold exceed 0.98. In this way, by optimizing the confidence of the head in this example, the same head can have better recall and precision in the process of tracking the target object, and the balance between recall and precision can be finally achieved.

In this example, the electronic device may input each video frame to the lightweight detection model, which may detect the head of the object in each video frame, for example, the head at various angles such as front, back, side and top, and generate the minimum bounding rectangle in combination with the shape of the object, based on the one-to-one correspondence between heads and objects, and thus acquire the object area where each object is located. That is, the electronic device may obtain the position of the head of each object and the object area where each object is located in the plurality of video frames in the video image data. Then, the electronic device may select the object whose head is located in the target area as the target object in combination with the above target area, and select the object area corresponding to the minimum bounding rectangle of the target object at the same time, that is, obtain the object area where the target object is located.

Figure 3:
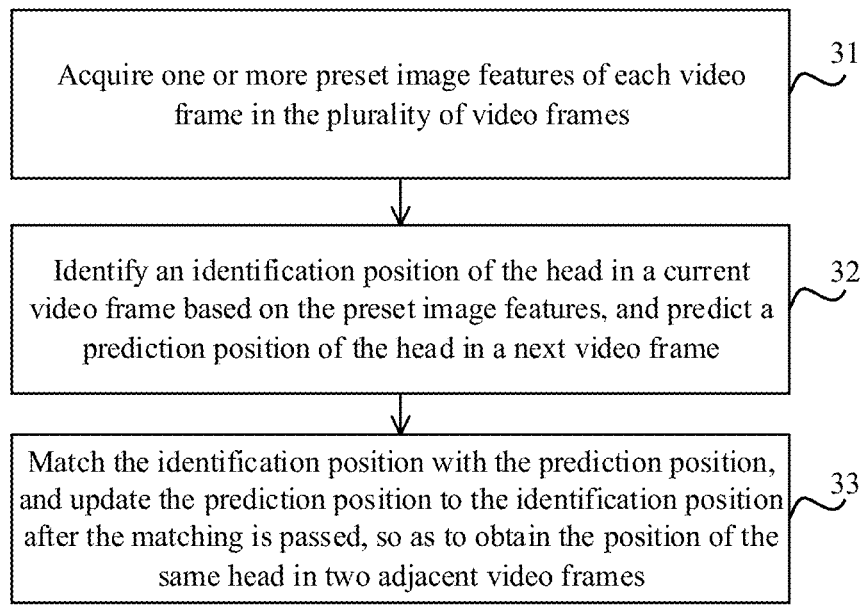
FIG. 3 is a flowchart illustrating tracking the same head according to an exemplary embodiment.

It can be understood that the above-mentioned head detection model can detect the head of an object in each video frame, but cannot determine whether heads in two adjacent video frames belong to the same object. Therefore, the process of acquiring the position of the head in each video frame by the electronic device may include acquiring the position of the head of the same object in different video frames, as shown in FIG. 3, which includes steps 31 to 33.

In step 31, for each video frame in the plurality of video frames, the electronic device may obtain one or more preset image features of a current video frame, such as color features or histogram of oriented gradient features. The one or more preset image features may be selected according to specific scenarios, and solutions where the preset image features can effectively distinguish the heads of different objects and reduce the computational complexity all fall within the protection scope of the present disclosure. It can be understood that, by reducing the computational complexity in this step, the resource requirements of the disclosed solution on the electronic device can be reduced, which is conducive to expand the application scope of the disclosed solution.

In step 32, the electronic device may identify an identification position of the head in the current video frame based on the preset image features. Step 32 can be implemented by using the above-mentioned lightweight detection model, which is not repeated here. The position of the head can be quickly identified by the lightweight detection model in this step, which is conducive to realize the real-time detection.

In step 32, the electronic device may also predict a prediction position of the head in the next video frame of the current video frame. For example, the electronic device may process video frames using fast tracking based on the Kalman filter model, so as to predict the position of the head and the motion speed of the head. It should be noted that, since only the prediction position of the head is concerned in this example, how to use the motion speed, which may be processed according to the requirements of the Kalman filter model, is not described in detail, and the corresponding solution falls within the protection scope of the present disclosure.

In step 33, electronic device may match the identification position with the prediction position, where the matching may be realized by the cosine distance of the feature vector. For example, when the cosine value of the feature vector corresponding to the identification position and the prediction position exceeds a cosine value threshold (which can be set, such as above 0.85), it may be determined that the identification position and the prediction position pass the matching. After the matching is passed, the electronic device may update the prediction position to the identification position, so as to obtain the position of the same head in the current video frame and the next video frame. In this way, by tracking the same head in this example, the loss of objects can be avoided, and the accuracy of the detection can be improved.

For example, the flow of head tracking by the electronic device is as follows:
  video frame Frame 0: the head detection model detects that Frame 0 includes three head detections, and there are no tracks currently, so these three detections are initialized as tracks;
  video frame Frame 1: the head detection model detects three detections again; the tracks in Frame 0 are first predicted to obtain new tracks; then, the new tracks are matched with the detections, and the matching model may include using the Hungary model to obtain (track, detection) matching pairs; finally, the corresponding track is updated with the detection in each matching pair.

In step 22, the electronic device may acquire a tempo-spatial relation between the object area and the target area, the tempo-spatial relation referring to a relative positional relation between the object area and the target area in space at different times.

In this embodiment, the electronic device may set two mark lines inside the target area, where the first mark line is closer to an edge of the target area than the second mark line, that is, the second mark line is between the first mark line and the monitored target. The principle is as follows:
  (1) the situation that the object directly enters and exits the target area vertically is identified by setting two horizontal mark lines at the top edge of the target area;
  (2) the situation that the object enters and exits the target area in parallel from the left side is identified by setting two vertical mark lines at the left edge of the target area;
  (3) the situation that the object enters and exits the target area in parallel from the right side is identified by setting two vertical mark lines at the right edge of the target area; and
  (4) a horizontal line is set at the bottom edge of the target area, and the distance between the object and the ground is identified, so as to distinguish whether the object passes by the monitored target or is likely to climb the monitored target.

Figure 7A:
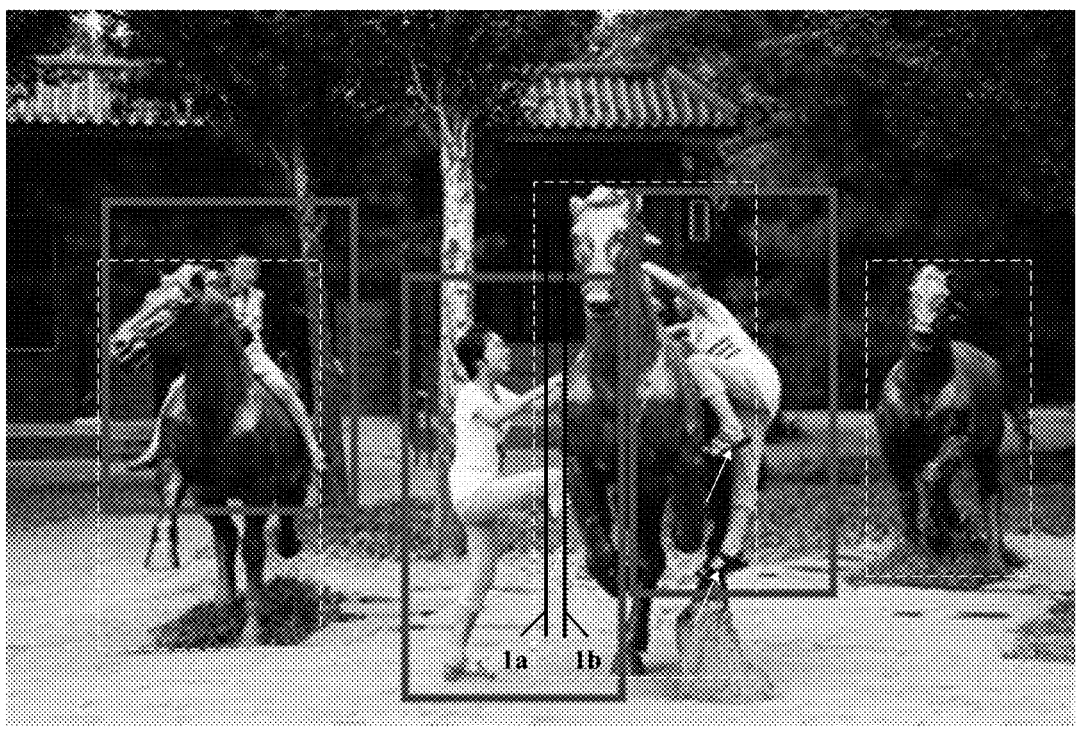
FIG. 7A is an effect diagram illustrating a tempo-spatial relation between an object area and a target area according to an exemplary embodiment.

Take setting two vertical mark lines at the left edge of the target area as an example. As shown in FIG. 7A, two mark lines 1a and 1b are set at the left edge of the target area corresponding to a sculpture (monitored target) in the middle, where the first mark line 1a is closer to the edge of the target area than the second mark line 1b, that is, the second mark line 1b is between the first mark line 1a and the monitored target.

Figure 7B:
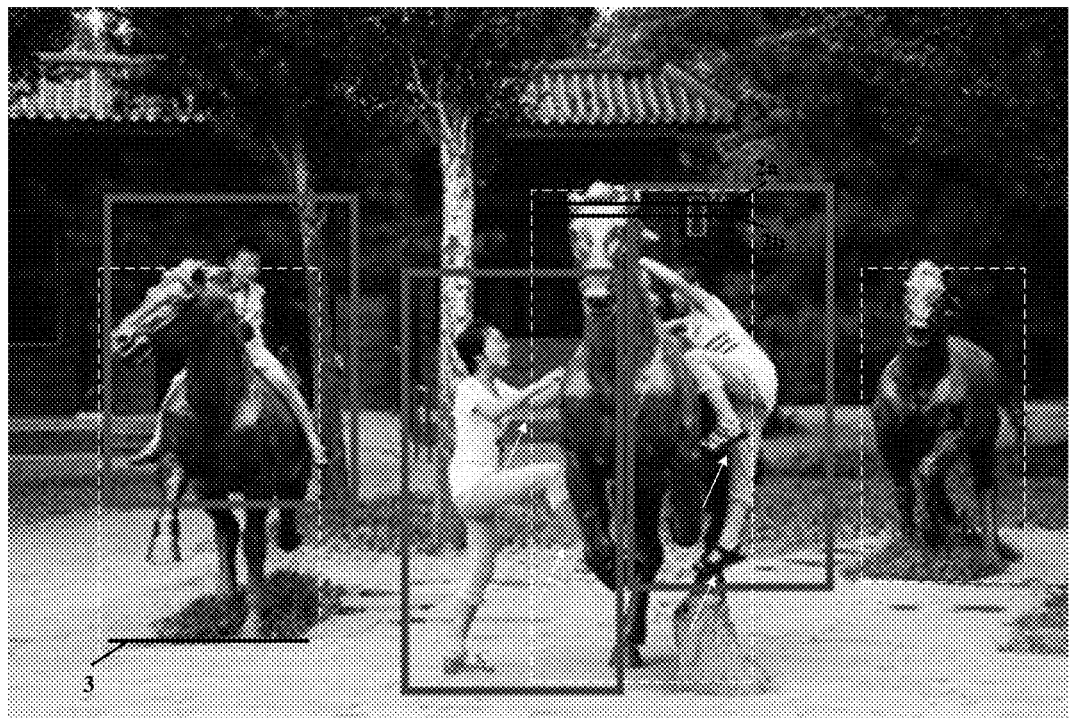
FIG. 7B is another effect diagram illustrating a tempo-spatial relation between an object area and a target area according to an exemplary embodiment.

In some embodiments, two horizontal mark lines may also be set at the top edge of the target area. For example, as shown in FIG. 7B, two mark lines 2a and 2b are set at the top edge of the target area corresponding to the sculpture (monitored target) in the middle, where the first mark line 2a is closer to the edge of the target area than the second mark line 2b, that is, the second mark line 2b is between the first mark line 2a and the monitored target.

In some embodiments, a horizontal mark lines may also be set at the bottom edge of the target area. For example, as shown in FIG. 7B, one mark line 3 is set at the bottom edge of the target area corresponding to a sculpture (monitored target) on the left.

In this embodiment, the electronic device may determine the tempo-spatial relationship between the object area and the target area according to the two mark lines, where the above-mentioned tempo-spatial relation refers to the relative positional relation between the object area and the target area in space at different times. The tempo-spatial relation includes at least one of the following: the object area is within the target area, the object area successively touches the edge and the two mark lines of the target area, the object area successively touches the two mark lines and the edge of the target area, the distance between the bottom edge of the object area and the bottom edge of the target area exceeds a set distance threshold, the distance between the bottom edge of the object area and the bottom edge of the target area is less than the set distance threshold, and the object area is outside the target area.

Taking the object area entering the target area as an example, the object area will move from the outside of the target area to the inside of the target area over time, that is, the object area will first "touch" the first mark line, and then "touch" the second mark line. Taking the object area leaving the target area as an example, the object area will move from the inside of the target area to the outside of the target area over time, that is, the object area will first "touch" the second mark line, and then "touch" the first mark line.

In step 23, when it is determined that the tempo-spatial relation satisfies the first preset condition, the electronic device may determine that the current behavior of the target object does not belong to the target behavior.

In this embodiment, the first preset condition may be stored in the electronic device in advance, and the first preset condition includes at least one of the following: the object area is within the target area and the distance between the bottom edge of the object area and a bottom edge of the target area does not exceed the set distance threshold, and the object area successively touches the edge and the two mark lines of the target area and the distance between the bottom edge of the object area and the bottom edge of the target area does not exceed the set distance threshold, where the two mark lines are provided between a connecting line of the target area and the monitored target. The first preset condition may be set according to specific scenarios, and the corresponding scheme which can determine that the target object passes by the monitored target, that is, the current behavior of the target object does not belong to uncivilized behavior, falls within the protection scope of the present disclosure.

Figure 4:
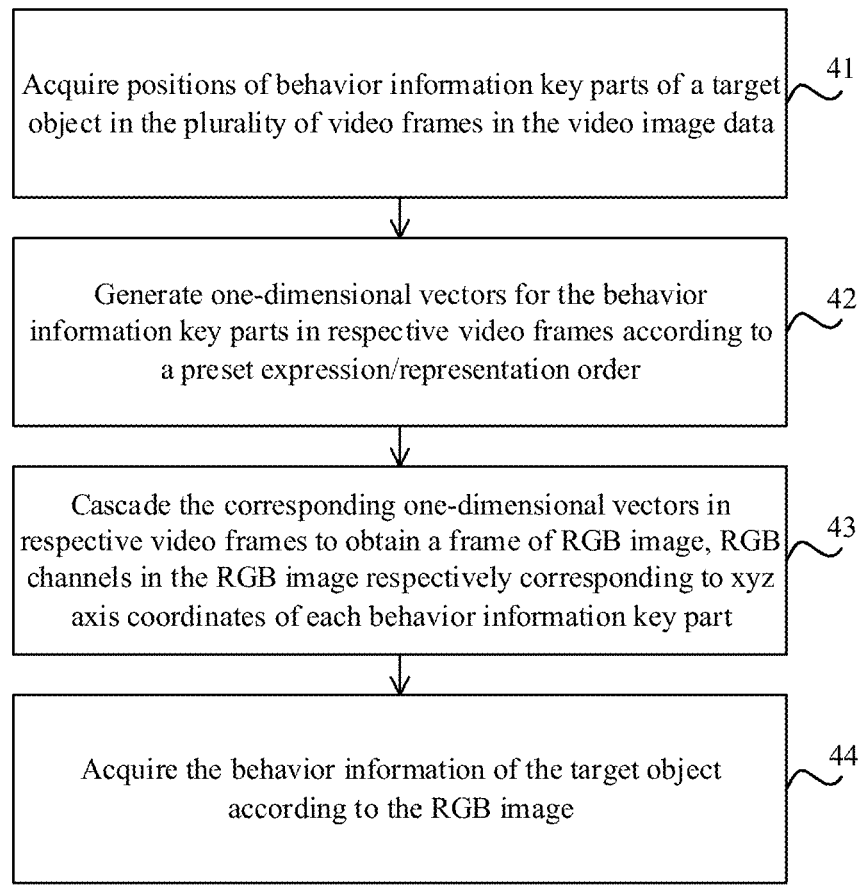
FIG. 4 is a flowchart illustrating acquiring a current behavior of a target object according to an exemplary embodiment.

In this embodiment, the electronic device may determine whether the tempo-spatial relation determined in step 22 satisfies the first preset condition. When it is determined that the tempo-spatial relation satisfies the first preset condition, the electronic device may determine that the current behavior of the target object does not belong to the target behavior, for example, the target object passes by monitored target. When it is determined that the tempo-spatial relation does not satisfy the first preset condition, and satisfies, for example, a second preset condition, the electronic device may determine that the current behavior of the target object may belong to the target behavior, and in this case, the electronic device may obtain the behavior information of the object entering the target area. It can be understood that the behavior information includes at least human posture. As shown in FIG. 4, steps 41 to 44 are included.

In step 41, for each video frame in the plurality of video frames in the video image data, the electronic device may obtain positions of behavior information key parts of the target object in each video frame. For example, a key point extraction model can be stored in the electronic device in advance, then each video frame is input into the key point extraction model, and the key points of the target object in each video frame may be extracted by the key point extraction model. The key points may include left arm bone points, right arm bone points, left leg bone points, right leg bone points and torso bone points.

Figure 5:
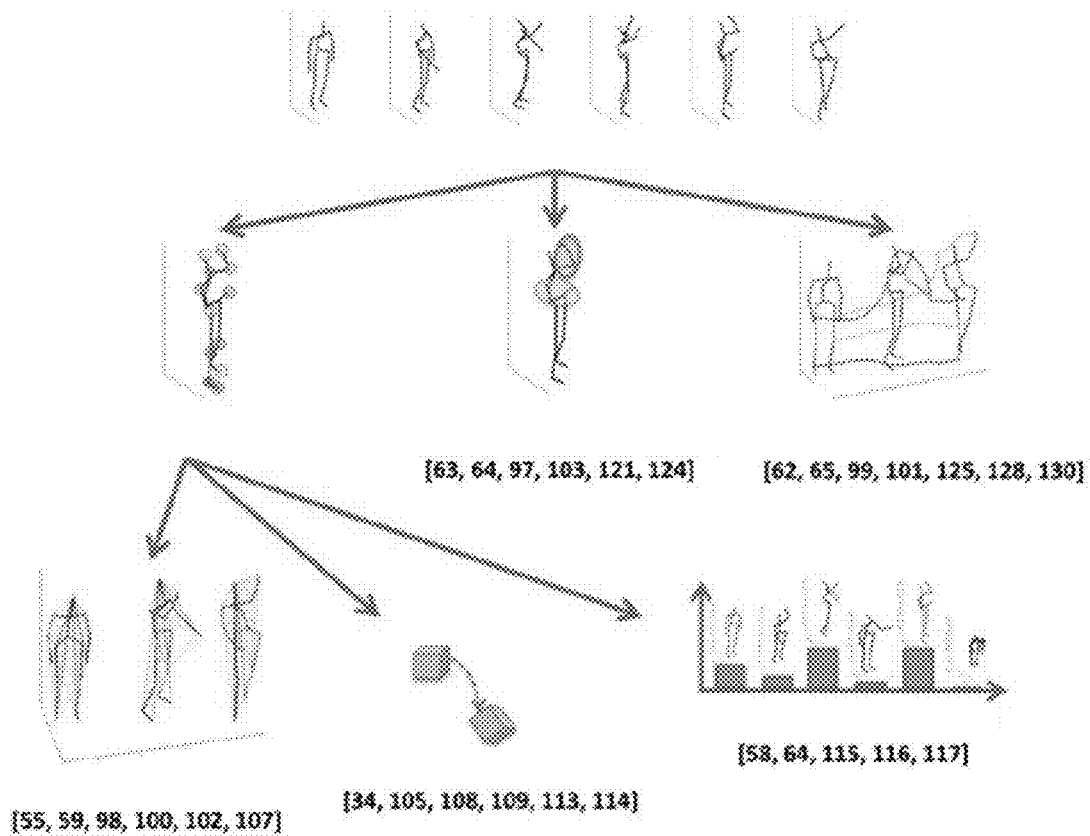
FIG. 5 is an effect diagram illustrating acquiring an action of a target object according to an exemplary embodiment.

In step 42, electronic device may generate one-dimensional vectors for the behavior information key parts in respective video frames according to a preset expression/representation order. For the one-dimensional vectors, vectors below the second and the third rows of graphics shown in FIG. 5 can be referred to, such as [63, 64, 97, 103, 121, 124]. The above expression order may include at least one of the following: left arm bone point, right arm bone point, left leg bone point, right leg bone point, and torso bone point; left arm bone point, right arm bone point, torso bone point, left leg bone point and right leg bone point; left arm bone point, torso bone point, left leg bone point, right arm bone point and right leg bone point. In other words, the corresponding solutions where the order of key points of left and right hands, left and right legs and torso is adjusted fall within the protection scope of the present disclosure.

In step 43, electronic device may cascade the corresponding one-dimensional vectors in respective video frames in video data to obtain a frame of RGB image, RGB channels in the RGB image respectively corresponding to xyz axis coordinates of each behavior information key part.

In step 44, the electronic device may acquire the behavior information of the target object according to the RGB image. In an example, the electronic device may perform classification based on the method for detecting behavior information of 3D bone points, including: the expression of behavior information based on coordinates of key points (the effect is shown in the first row of graphics in FIG. 5), including spatial descriptors (the effect is shown in the leftmost graphic in the third row in FIG. 5), geometrical descriptors (the effect is shown in the middle graphic in the third row in FIG. 5), and key-poses descriptors (the effect is shown in the rightmost graphic in the third row in FIG. 5). After such processing, including considering the correlation of key points in subspace to improve the discrimination degree and considering the matching degree of different video sequences based on the dynamic programming model, the behavior information of the target object can be obtained finally.

In step 13, video frames in which the at least one object is included are marked when it is determined that the behavior information indicates that the at least one object climbs the monitored target.

Figure 6:
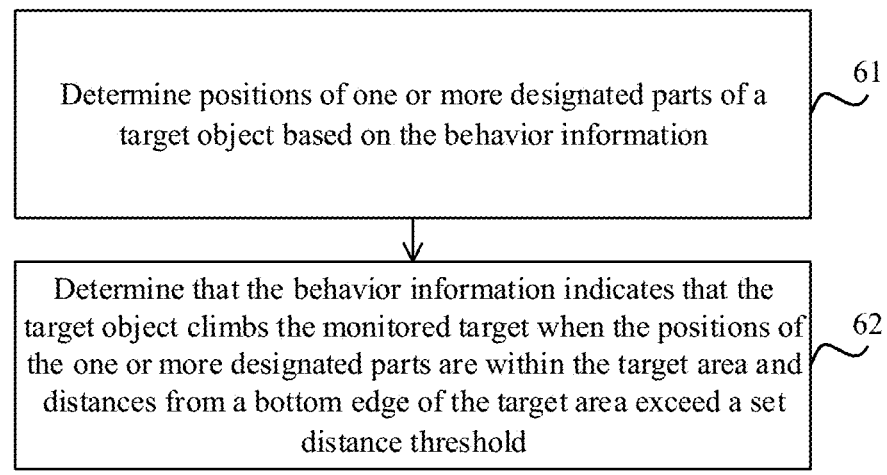
FIG. 6 is a flowchart illustrating determining whether behavior information indicates that an object climbs a monitored target according to an exemplary embodiment.

In this embodiment, after determining the behavior information of the target object, the electronic device may determine whether the behavior information indicates that the object climbs the monitored target, as shown in FIG. 6, which includes steps 61 and 62. In step 61, the electronic device may determine positions of one or more designated parts of the target object based on the behavior information. Taking the designated parts being legs of the object as an example, after the action of the target object is determined, positions of the left leg and the right leg of the target object can be determined. As shown in FIG. 7, the right leg of the target object at the left side of the sculpture in the middle is within the target area, the left and right legs of the target object at the right side of the sculpture are within the target area, and both legs of the target object near the sculpture on the left are within the target area. It should be noted that, in practical applications, there is no need to show edges of the target area, so the edges of the target areas are all indicated by dotted lines in FIG. 7 to facilitate understanding of the solution of the present disclosure. In step 62, when the positions of the one or more designated parts are within the target area and the distances from the bottom edge of the target area exceed a set distance threshold, the electronic device may determine that the behavior information indicates that the target object climbs the monitored target.

It can be understood that, when the target object passes by the monitored target, the bottom edge of the object area of the target object theoretically overlaps with the bottom edge of the target area, that is, the distance between them is 0. Considering that the legs of the target object will rise to a certain height when performing the walking action, which may cause the bottom edge of the object area to be slightly higher than the bottom edge of the target area, that is, there is a certain distance between the bottom edge of the object area and the bottom edge of the target area (such as 10~30 cm, which may be set), so the above set distance threshold is set to ensure that the influence caused by the object passing by the monitored target is eliminated. In other words, when the positions of the one or more designated parts are within the target area and the distance from the positions of the one or more designated parts to the bottom edge of the target area exceeds the set distance threshold, the electronic device may determine that the target object climbs the monitored target.

In this embodiment, when it is determined that the target object climbs the monitored target, video frames in which the target object is included are marked. In some examples, when marking the corresponding video frames, face images of the target object may also be extracted, and the video frames and the face images may be associated, so that managers can see the face images while reviewing the above-mentioned video frames, so as to timely confirm the identity of the target object. In this way, by marking the video frames in the video image data in this embodiment, the preset target behaviors (i.e., uncivilized behaviors) can be found in time, and management efficiency can be improved.

Figure 8:
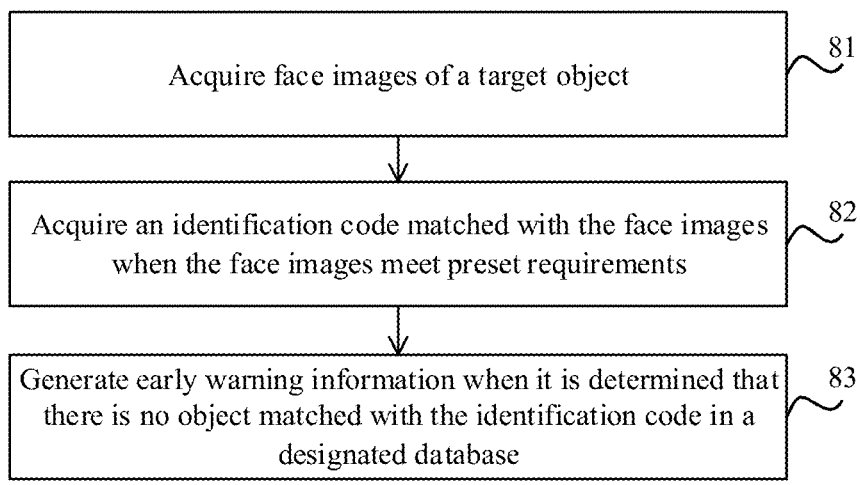
FIG. 8 is a flowchart illustrating another method for early warning of climbing behaviors according to an exemplary embodiment.

In an embodiment, after step 13, the electronic device may further generate an early warning signal, as shown in FIG. 8, which includes steps 81 to 83.

In step 81, the electronic device may acquire face images of the target object. The face image may be acquired synchronously in the process of identifying the head of the target object, or the face image may be acquired after it is determined that the current behavior of the target object is the target behavior. It can be understood that, not behaviors of all objects located in the target area need to be determined, so the number of face images that need to acquire in the latter case is less than that in the former case, thus the amount of data processing can be reduced.

In step 82, when the face images meet preset requirements, the electronic device may acquire an identification code matched with the face images. The preset requirements include key points of a face can be obtained and a confidence of an identification result exceeds a set confidence threshold. For example, the electronic device may acquire attribute information of the face images, where the attribute information may include, but is not limited to, gender, age, height, skin color, and positions of facial key points. Then, the electronic device may generate the identification code matched with the face images according to the attribute information, and store the generated identification code in a designated database.

In step 83, when it is determined that there is no object matched with the above-mentioned identification code in the designated database, it may be determined that the target object is not a manager but a tourist. In this case, the electronic device may generate early warning information, for example, a tourist is climbing the sculpture, please hold attention. The electronic device may further provide the above-mentioned early warning information to the corresponding personnel, for example, notify the manager by telephone or text message, or directly call the police.

It can be seen that, by identifying the target object in this embodiment, the case where the manager performs the target behaviors to maintain the monitored target can be excluded, so as to improve the accuracy of the early warning.

Figure 9:
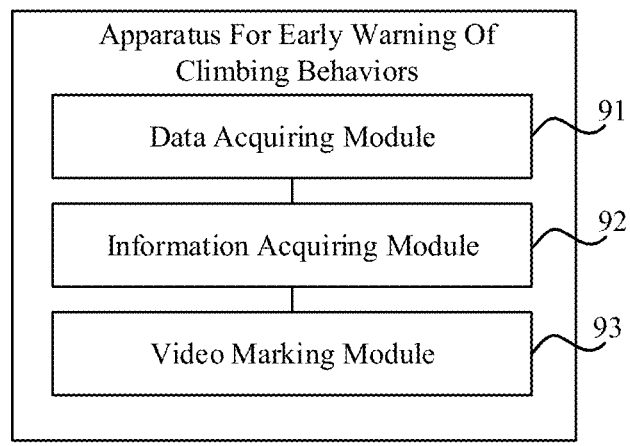
FIG. 9 is a block diagram illustrating an apparatus for early warning of climbing behaviors according to an exemplary embodiment.

On the basis of the methods for early warning of climbing behaviors provided by the above-mentioned embodiments, an embodiment of the present disclosure also provides an apparatus for early warning of climbing behaviors, as shown in FIG. 9, the apparatus includes:
a data acquiring module 91, configured to acquire video image data including a monitored target and at least one object;
an information acquiring module 92, configured to acquire behavior information of the at least one object when it is determined that the at least one object enters a target area corresponding to the monitored target; and
a video marking module 93, configured to mark video frames in which the at least one object is included when it is determined that the behavior information indicates that the at least one object climbs the monitored target.

In an embodiment, the information acquiring module includes:
an area acquiring sub-module, configured to acquire the target area where the monitored target is located in a plurality of video frames in the video image data and acquire an object area where a target object is located, a head of the target object being located in the target area;
a relation acquiring sub-module, configured to acquire a tempo-spatial relation between the object area and the target area, the tempo-spatial relation referring to a relative positional relation between the object area and the target area in space at different times; and
an area determining sub-module, configured to determine that the target object enters the target area when it is determined that the tempo-spatial relation satisfies a first preset condition,
where the first preset condition includes at least one of the following: the object area is within the target area and a distance between a bottom edge of the object area and a bottom edge of the target area does not exceed a set distance threshold, and the object area successively touches an edge and two mark lines of the target area and the distance between the bottom edge of the object area and the bottom edge of the target area does not exceed the set distance threshold, where the two mark lines are provided between a connecting line of the target area and the monitored target.

In an embodiment, the tempo-spatial relation includes at least one of the following:
the object area is within the target area, the object area successively touches the edge and the two mark lines of the target area, the object area successively touches the two mark lines and the edge of the target area, the distance between the bottom edge of the object area and the bottom edge of the target area exceeds the set distance threshold, the distance between the bottom edge of the object area and the bottom edge of the target area is less than the set distance threshold, and the object area is outside the target area.

In an embodiment, the area acquiring sub-module includes:
a position acquiring unit, configured to acquire a position of a head of each object and an object area where each object is located in the plurality of video frames in the video image data; and
an object selecting unit, configured to select an object whose head is located in the target area as the target object and acquire the object area where the target object is located.

In an embodiment, the position acquiring unit includes:
a feature acquiring sub-unit, configured to acquire one or more preset image features of each video frame in the plurality of video frames;
a position predicting sub-unit, configured to identify an identification position of the head in a current video frame based on the one or more preset image features and predict a prediction position of the head in a next video frame; and
a position acquiring sub-unit, configured to match the identification position with the prediction position and update the prediction position to the identification position after the matching is passed, so as to obtain the position of the same head in two adjacent video frames.

In an embodiment, the information acquiring module includes:
a position acquiring sub-module, configured to acquire positions of behavior information key parts of a target object in the plurality of video frames in the video image data, a head of the target object being located in the target area, and the behavior information including human posture;

a vector generating sub-module, configured to generate one-dimensional vectors for the behavior information key parts in respective video frames according to a preset expression order;

an image acquiring sub-module, configured to cascade the corresponding one-dimensional vectors in respective video frames to obtain a frame of RGB image, RGB channels in the RGB image respectively corresponding to xyz axis coordinates of each of the behavior information key parts; and a behavior information acquiring sub-module, configured to acquire the behavior information of the target object according to the RGB image.

In an embodiment, the video marking module includes:

a position determining sub-module, configured to determine positions of one or more designated parts of a target object based on the behavior information, the behavior information including human posture; and a target determining sub-module, configured to, when the positions of the one or more designated parts are within the target area and distances from a bottom edge of the target area exceed a set distance threshold, determine that the behavior information indicates that the target object climbs the monitored target.

In an embodiment, the apparatus further includes:

an image acquiring module, configured to acquire face images of a target object;

an identification code acquiring module, configured to acquire an identification code matched with the face images when the face images meet preset requirements, the preset requirements including key points of a face can be obtained and a confidence of an identification result exceeds a set confidence threshold; and a signal generating module, configured to generate early warning information when it is determined that there is no object matched with the identification code in a designated database.

It should be noted that the apparatus shown in the embodiments matches the contents of the method embodiments shown in FIG. 1, and the contents of the above-mentioned method embodiments may be referred to, which will not be repeated here.

Figure 10:
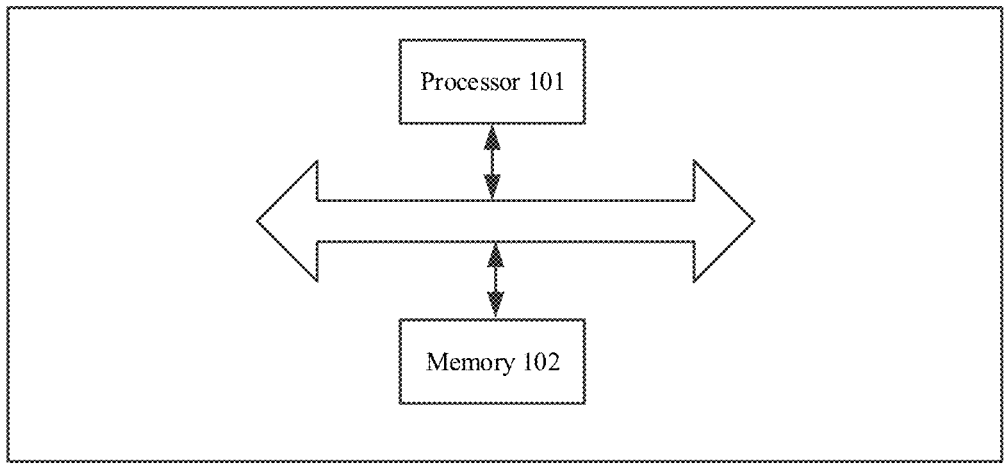
FIG. 10 is a block diagram of an electronic device according to an exemplary embodiment.

In an exemplary embodiment, there is also provided an electronic device. As shown in FIG. 10, the electronic device includes:

a processor 101;

a memory 102 configured to store a computer program executable by the processor, where the processor 101 is configured to execute the computer program in the memory 102 to implement the steps of the method as described in FIG. 1.

In an exemplary embodiment, there is also provided a non-volatile computer readable storage medium 102, such as a memory including instructions, and the above-mentioned executable computer program may be executed by a processor to implement the steps of the method as described in FIG. 1. The readable storage medium may be ROM, random access memory (RAM), CD-ROM, magnetic tape, floppy disk, optical data storage device, and the like.

Other embodiments of the present disclosure will be easily conceived of by those skilled in the art upon consideration of the specification and practice of the disclosure disclosed herein. The present disclosure is intended to cover any modifications, uses or adaptations that follow the general principles of the present disclosure and include common knowledge or customary technical means in the technical field not disclosed by the present disclosure. The specification and embodiments are to be regarded as exemplary only, and the true scope and spirit of the present disclosure are indicated by the following claims.

It should be understood that the present disclosure is not limited to the precise structures described above and illustrated in the accompanying drawings, and that various modifications and changes may be made without departing from the scope thereof. The scope of the present disclosure is limited only by the appended claims.

The invention claimed is:

1. A method for early warning of climbing behaviors, comprising:

acquiring video image data comprising a monitored target and at least one object;

acquiring behavior information of the at least one object when it is determined that the at least one object enters a target area corresponding to the monitored target; and marking video frames in which the at least one object is included when it is determined that the behavior information indicates that the at least one object climbs the monitored target;

wherein determining that the at least one object enters the target area corresponding to the monitored target comprises:

acquiring the target area where the monitored target is located in a plurality of video frames in the video image data, and acquiring an object area where a target object is located, a head of the target object being located in the target area;

acquiring a tempo-spatial relation between the object area and the target area, the tempo-spatial relation referring to a relative positional relation between the object area and the target area in space at different times; and determining that the target object enters the target area when it is determined that the tempo-spatial relation satisfies a first preset condition, wherein the first preset condition comprises at least one of the following: the object area is within the target area and a distance between a bottom edge of the object area and a bottom edge of the target area does not exceed a set distance threshold, and the object area successively touches an edge and two mark lines of the target area and the distance between the bottom edge of the object area and the bottom edge of the target area does not exceed the set distance threshold, wherein the two mark lines are provided between a connecting line of the target area and the monitored target.

2. The method according to claim 1, wherein the tempo-spatial relation comprises at least one of the following:

the object area is within the target area, the object area successively touches the edge and the two mark lines of the target area, the object area successively touches the two mark lines and the edge of the target area, the distance between the bottom edge of the object area and the bottom edge of the target area exceeds the set distance threshold, the distance between the bottom edge of the object area and the bottom edge of the target area is less than the set distance threshold, and the object area is outside the target area.

3. The method according to claim 1, wherein acquiring the object area where the target object is located comprises:

acquiring a position of a head of each object and an object area where each object is located in the plurality of video frames in the video image data; and selecting an object whose head is located in the target area as the target object, and acquiring the object area where the target object is located.

4. The method according to claim 3, wherein acquiring the position of the head of each object in the plurality of video frames in the video image data comprises:
- acquiring one or more preset image features of each video frame in the plurality of video frames;
- identifying an identification position of the head in a current video frame based on the one or more preset image features, and predicting a prediction position of the head in a next video frame; and
- matching the identification position with the prediction position, and updating the prediction position to the identification position after the matching is passed, so as to obtain the position of the same head in two adjacent video frames.

5. The method according to claim 1, wherein acquiring the behavior information of the at least one object comprises:
- acquiring positions of behavior information key parts of a target object in the plurality of video frames in the video image data, a head of the target object being located in the target area, and the behavior information comprising human posture;
- generating one-dimensional vectors for the behavior information key parts in respective video frames according to a preset expression order;
- cascading the corresponding one-dimensional vectors in respective video frames to obtain a frame of RGB image, RGB channels in the RGB image respectively corresponding to xyz axis coordinates of each of the behavior information key parts; and
- acquiring the behavior information of the target object according to the RGB image.

6. The method according to claim 1, wherein determining that the behavior information indicates that the at least one object climbs the monitored target comprises:
- determining positions of one or more designated parts of a target object based on the behavior information, the behavior information comprising human posture; and
- when the positions of the one or more designated parts are within the target area and distances from a bottom edge of the target area exceed a set distance threshold, determining that the behavior information indicates that the target object climbs the monitored target.

7. The method according to claim 1, wherein after marking the video frames in which the at least one object is included, the method further comprises:
- acquiring face images of a target object;
- acquiring an identification code matched with the face images when the face images meet preset requirements, the preset requirements comprising key points of a face can be obtained and a confidence of an identification result exceeds a set confidence threshold; and
- generating early warning information when it is determined that there is no object matched with the identification code in a designated database.

8. An electronic device, comprising:
- a processor; and
- a memory configured to store a computer program executable by the processor,
- wherein the processor is configured to execute the computer program in the memory to perform the following operations:
- acquiring video image data comprising a monitored target and at least one object;
- acquiring behavior information of the at least one object when it is determined that the at least one object enters a target area corresponding to the monitored target; and
- marking video frames in which the at least one object is included when it is determined that the behavior information indicates that the at least one object climbs the monitored target;
- wherein the processor is further configured to execute the computer program to perform:
- acquiring the target area where the monitored target is located in a plurality of video frames in the video image data, and acquiring an object area where a target object is located, a head of the target object being located in the target area;
- acquiring a tempo-spatial relation between the object area and the target area, the tempo-spatial relation referring to a relative positional relation between the object area and the target area in space at different times; and
- determining that the target object enters the target area when it is determined that the tempo-spatial relation satisfies a first preset condition,
- wherein the first preset condition comprises at least one of the following: the object area is within the target area and a distance between a bottom edge of the object area and a bottom edge of the target area does not exceed a set distance threshold, and the object area successively touches an edge and two mark lines of the target area and the distance between the bottom edge of the object area and the bottom edge of the target area does not exceed the set distance threshold, wherein the two mark lines are provided between a connecting line of the target area and the monitored target.

9. The electronic device according to claim 8, wherein the tempo-spatial relation comprises at least one of the following:
- the object area is within the target area, the object area successively touches the edge and the two mark lines of the target area, the object area successively touches the two mark lines and the edge of the target area, the distance between the bottom edge of the object area and the bottom edge of the target area exceeds the set distance threshold, the distance between the bottom edge of the object area and the bottom edge of the target area is less than the set distance threshold, and the object area is outside the target area.

10. The electronic device according to claim 8, wherein the processor is further configured to execute the computer program to perform:
- acquiring a position of a head of each object and an object area where each object is located in the plurality of video frames in the video image data; and
- selecting an object whose head is located in the target area as the target object and acquiring the object area where the target object is located.

11. The electronic device according to claim 10, wherein the processor is further configured to execute the computer program to perform:
- acquiring one or more preset image features of each video frame in the plurality of video frames;
- identifying an identification position of the head in a current video frame based on the one or more preset image features, and predicting a prediction position of the head in a next video frame; and
- matching the identification position with the prediction position, and updating the prediction position to the identification position after the matching is passed, so as to obtain the position of the same head in two adjacent video frames.

12. The electronic device according to claim 8, wherein the processor is further configured to execute the computer program to perform:
- acquiring positions of behavior information key parts of a target object in the plurality of video frames in the video image data, a head of the target object being located in the target area, and the behavior information comprising human posture;
- generating one-dimensional vectors for the behavior information key parts in respective video frames according to a preset expression order;
- cascading the corresponding one-dimensional vectors in respective video frames to obtain a frame of RGB image, RGB channels in the RGB image respectively corresponding to xyz axis coordinates of each of the behavior information key parts; and
- acquiring the behavior information of the target object according to the RGB image.

13. The electronic device according to claim 8, wherein the processor is further configured to execute the computer program to perform:
- determining positions of one or more designated parts of a target object based on the behavior information, the behavior information comprising human posture; and
- when the positions of the one or more designated parts are within the target area and distances from a bottom edge of the target area exceed a set distance threshold, determining that the behavior information indicates that the target object climbs the monitored target.

14. The electronic device according to claim 8, wherein the processor is further configured to execute the computer program to perform:
- acquiring face images of a target object;
- acquiring an identification code matched with the face images when the face images meet preset requirements, the preset requirements comprising key points of a face can be obtained and a confidence of an identification result exceeds a set confidence threshold; and
- generating early warning information when it is determined that there is no object matched with the identification code in a designated database.

15. A non-transitory computer readable storage medium, wherein when an executable computer program in the storage medium is executed by a processor, the following operations are performed:
- acquiring video image data comprising a monitored target and at least one object;
- acquiring behavior information of the at least one object when it is determined that the at least one object enters a target area corresponding to the monitored target; and
- marking video frames in which the at least one object is included when it is determined that the behavior information indicates that the at least one object climbs the monitored target;

wherein when the executable computer program is executed by the processor, the following operations are further performed:
- acquiring the target area where the monitored target is located in a plurality of video frames in the video image data, and acquiring an object area where a target object is located, a head of the target object being located in the target area;
- acquiring a tempo-spatial relation between the object area and the target area, the tempo-spatial relation referring to a relative positional relation between the object area and the target area in space at different times; and
- determining that the target object enters the target area when it is determined that the tempo-spatial relation satisfies a first preset condition, wherein the first preset condition comprises at least one of the following: the object area is within the target area and a distance between a bottom edge of the object area and a bottom edge of the target area does not exceed a set distance threshold, and the object area successively touches an edge and two mark lines of the target area and the distance between the bottom edge of the object area and the bottom edge of the target area does not exceed the set distance threshold, wherein the two mark lines are provided between a connecting line of the target area and the monitored target.

16. The non-transitory computer readable storage medium according to claim 15, wherein when the executable computer program is executed by the processor, the following operations are further performed:
- acquiring a position of a head of each object and an object area where each object is located in the plurality of video frames in the video image data; and
- selecting an object whose head is located in the target area as the target object and acquire the object area where the target object is located.

17. The non-transitory computer readable storage medium according to claim 16, wherein when the executable computer program is executed by the processor, the following operations are further performed:
- acquiring one or more preset image features of each video frame in the plurality of video frames;
- identifying an identification position of the head in a current video frame based on the one or more preset image features, and predicting a prediction position of the head in a next video frame; and
- matching the identification position with the prediction position, and updating the prediction position to the identification position after the matching is passed, so as to obtain the position of the same head in two adjacent video frames.

* * * * *